United States Patent [19]
Bucks et al.

[11] 3,708,750
[45] Jan. 2, 1973

[54] ELAPSED TIME INDICATOR

[75] Inventors: Robert M. Bucks, Norristown; Frederick M. Ayars, Lansdale, both of Pa.

[73] Assignee: Autonumerics Corporation, Lake Park, Fla.

[22] Filed: Aug. 20, 1970

[21] Appl. No.: 65,589

Related U.S. Application Data

[63] Continuation-in-part of Ser. No. 872,226, Oct. 29, 1969, abandoned.

[52] U.S. Cl. ............... 324/178, 324/162, 324/174, 235/92
[51] Int. Cl. ............................................. G01p 3/42
[58] Field of Search ...... 324/160, 162, 166, 168, 171, 324/173, 174, 175, 178–180, 158 MG; 235/92 A, 92 T, 104, 150.2, 151.32; 58/39.5, 152, 145; 73/514, 518, 519; 340/262, 263

[56] References Cited

UNITED STATES PATENTS

| | | | |
|---|---|---|---|
| 3,125,884 | 3/1964 | Davies | 324/162 |
| 3,530,382 | 9/1970 | Liston | 324/178 |

*Primary Examiner*—Michael J. Lynch

[57] ABSTRACT

An electronic apparatus for measuring the time required for a vehicle to travel a predetermined distance such as a quarter mile. The exemplary embodiment described comprises pulse generating means for producing a pulse for each increment of distance traveled in combination with an integrating means for accumulating such pulses and producing a stop count signal when the output of the integrating means reaches a predetermined level. By adjusting a duty cycle of the individual pulses input to the integrating means, the predetermined point at which the stop count output is produced may be made to correspond to a desired predetermined value of traveled distance. Clock pulses are counted by a digital counter from a time determined by either manual or automatic start means until said stop count signal is produced at which time the counter is adapted to hold its contents until being reset. An indicator is also associated with the counter for visually displaying the contents of the counter indicating the elapsed time required for the vehicle to travel the predetermined distance as determined by the pulse width adjustment.

6 Claims, 2 Drawing Figures

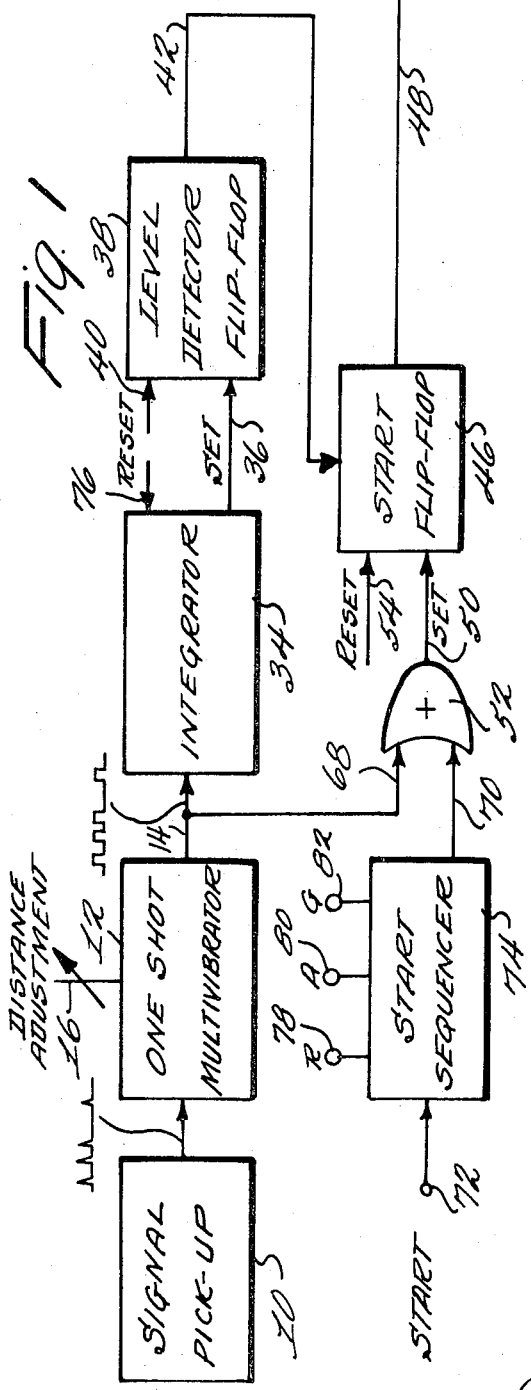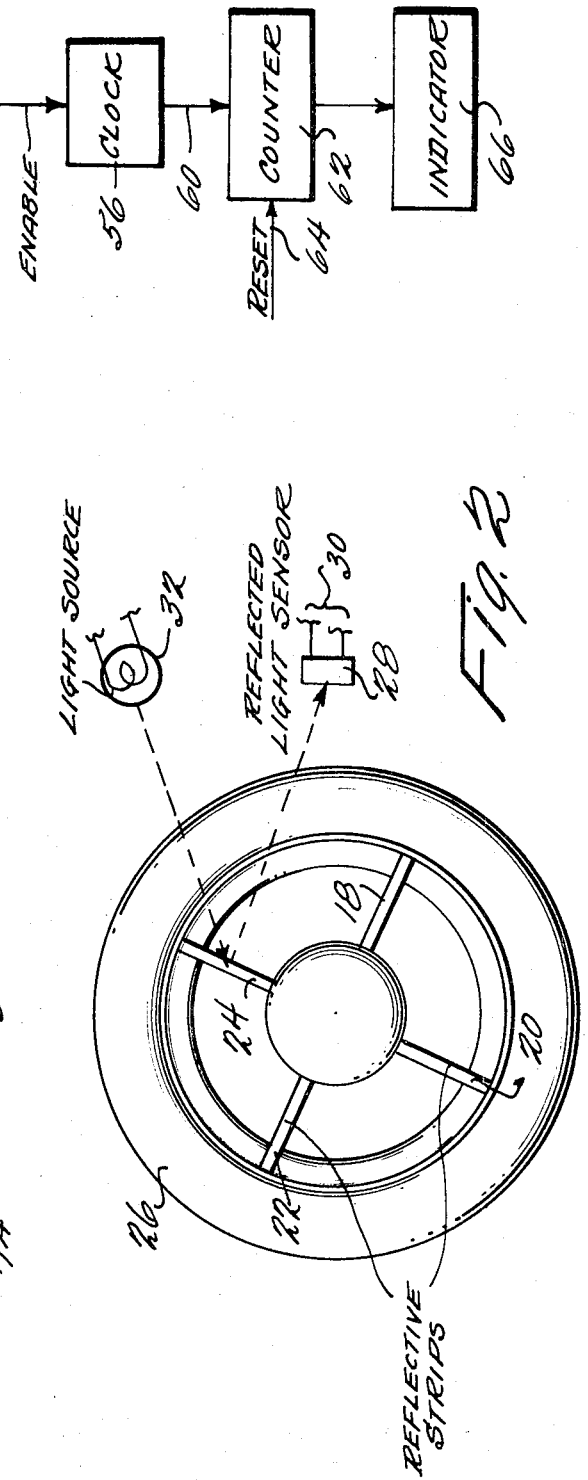

ELAPSED TIME INDICATOR

This invention is a continuation-in-part of co-pending application Ser. No. 872,226 filed on Oct. 29, 1969 now abandoned.

It generally relates to an electronic elapsed time measuring means, and in particular, such means designed for measuring the time required for a vehicle to travel through a predetermined distance.

In the past, measurement of the time required for traveling a preselected standard distance (such as one-fourth of a mile) has necessitated the attachment of additional road contacts such as an extra wheel or the use of external devices such as pressure sensitive tape or switches on the road surface itself. Other possibilities are external photoelectric, acoustic or radar sensors. Thus, in most known methods, the accurate elapsed time measurement for a vehicle to travel a selected distance is measureable only at an especially prepared roadway. Additionally, many of the prior known methods for accomplishing such elapsed time measurements require the presence of an additional person or operator at such a fixed and measured course, or with such semi-permanent external timing apparatus as is involved in additional wheels attached to a vehicle.

Accordingly, it is an object of this invention to provide a completely electronic and portable elapsed time indicator which may be easily installed using only hand tools and which does not interfere in any way with the normal operation or safety of the vehicle involved.

It is a further object of this invention to provide a self contained and extremely accurate electronic means for measuring and indicating the time required for a vehicle to travel a predetermined distance from a standing start or zero initial velocity.

Briefly, the operation of this invention involves means for generating pulses proportional in number to the value of the measured parameter such as distance. When the measured parameter is at a first value, these pulses are input to an integrating means which produces an output signal proportional to either the number of pulses and/or the number and width of the pulses. When the output level of the integrating means passes a predetermined value corresponding to a second value of the measured parameter (i.e. distance) a stop signal is produced. Between the time when the measured parameters at the first value and the time when the stop signal is produced, clock pulses occurring at a predetermined rate are counted by digital counter means. Thus, after said stop signal has occurred, the contents of the counter are proportional to the elapsed time required for the measured parameter to change from the first value to the second value.

In addition to the basic apparatus, special starting means are included for either manually or automatically initiating a cycle of the measuring apparatus and visual indicating means are associated with the counter for visually indicating the contents as the measured elapsed time.

A special exemplary embodiment of a means for generating pulses proportional in number to increments of travel distances also included as a part of the following description.

A more complete understanding of this invention may be obtained by carefully studying the following detailed description in conjunction with the drawings of which:

FIG. 1 is a block diagram of an exemplary embodiment of the elapsed time measuring apparatus of this invention, and FIG. 2 is an exemplary embodiment of a portion of a pulse generating means for use with the apparatus of FIG. 1.

Referring to FIG. 1, a signal pickup 10 is shown at the extreme left which represents a means for generating pulses proportional in number to the value of a measured parameter, such as traveled distance. Depending upon the particular apparatus employed, these individual pulses respectively representing individual increments of traveled distance may themselves comprise very short pulses having somewhat variable width depending upon changes in vehicle acceleration, etc. Thus, a one-shot multivibrator 12 is provided as shown in FIG. 1 to convert pulses from signal pickup 10 into a train of pulses having a predetermined constant pulse width at the output 14. As will be later explained, the predetermined distance for which the elapsed time measurement is to be made may be adjusted by changing the pulse width of the pulses at output 14 through distance adjustment 16.

Briefly referring to FIG. 2, an exemplary embodiment for signal pickup 10 is shown wherein four reflective strips, 18, 20, 22, 24 are spaced at equal distances about the tire 26 of a vehicle. (The strips may be adhered to the tire itself or mounted on the rim as shown in FIG. 2.) As each of the reflecting strips 18 - 24 passes by light sensor 28, an output pulse is produced on lines 30 which may be directly input or input through an amplifier apparatus to one-shot multivibrator 12. To enhance the signal at terminals 30 of sensor 28, a light source 32 may also be provided to increase the ambient light level available for reflection from the reflective strips. Since the reflective strips are equally spaced around the tire 26 which has a known circumference, each pulse throughout terminals 30 thus corresponds to a finite increment of traveled distance.

Those skilled in the art will readily appreciate that there may be many other equivalent means for producing pulses proportional in number to the value of the measured parameters such as traveled distance. For instance, the number reflecting strips may be either increased or decreased from those shown in FIG. 2. Magnetic pickup means may be employed in conjunction with magnetically permeable or flux producing materials spaced about the tire 26. Or, alternatively, other points in the vehicular system may be tapped to produce the required pulse train as for instance a speedometer cable or wheel axles, etc.

Referring back to FIG. 1, the output from one-shot multivibrator 12 is input to an integrator 34 which may be constructed according to known principles for effectively accumulating the constant pulse-width pulses occurring on line 14. If the distance adjustment is made by another method (i.e. frequency conversion) rather than by varying the pulse-width of pulses at line 14, then the integrator 34 could in fact comprise a digital counter for accumulating the total number of pulses produced which of course would be proportional to the total distance traveled since each pulse represents a finite increment of traveled distance.

On the other hand, in the exemplary embodiment shown in FIG. 1, a distance adjustment is contemplated which involves varying the pulse-width of the pulses input to integrator 34. Accordingly, the integrator 34 in FIG. 1 should be adapted to respond to not only the number of pulses but to the pulse-width of the pulses as well. An analog integrator wherein charge is accumulated on a capacitor or some other accumulating means for the duration of each input pulse is one simple type of integrator means 34 which would readily suggest itself to one skilled in the art. Other equivalent integrator means will be readily apparent to those skilled in the art.

Thus, the output of integrator 34 on line 36 represents a steadily increasing signal representing an accumulation of the pulses on line 14 which, as will be discussed below, are caused to begin occurring after the occurrence of a first value of the measured parameter such as traveled distance. In the exemplary embodiment shown in FIG. 1, this first value corresponds to a zero initial velocity or a standing start for the vehicle. Thus, the output at line 36 from integrator 34 is a function of the distance traveled from the starting point and may be used to trip level detector 38 when the signal on line 36 reaches a predetermined level corresponding to a predetermined terminal distance for which the elapsed time measurement is desired. It should now be apparent that by adjusting the pulse-width of pulses on line 14 (by adjusting the period of one-shot multivibrator as is well known by those skilled in the art) by means 16, the predetermined point at which level detector 38 changes its state may be made to correspond to adjustable predetermined distances. In the exemplary embodiment, this distance is usually adjusted to equal one-fourth of a mile since this is the usual parameter used for such elapsed time measurements.

In the exemplary embodiment shown in FIG. 1, level detector 38 includes a flip-flop which when reset at line 40 produces a "0" output at line 42 which is input to set overide to start flip-flop 46. When set by a signal on line 36 reaching said predetermined level, the signal on line 42 will change to a "1" signal. A start flip-flop 46 is also shown in FIG. 1 with its output 48 connected to the clock 56 enable terminal. Flip-flop 46 is connected so as to have a "1" output after being set by a signal on line 50 from OR gate 52 and to have a "0" output after being reset by a signal on line 54.

A clock 56 is also shown in FIG. 1 for producing a train of clock pulses having a predetermined repetition rate but which clock pulses are produced only if an "enable" signal is present on line 48 at the output from start flip-flop 46. That is, clock 56 will only produce a train of output clock pulses on line 60 if an enable signal ("1") is present on line 48.

Finally, the clock pulses are fed into counter 62 which operates in a known manner to count the pulses and to maintain the count until being reset on line 64. An indicator 66 of any type which is well known in the art is also connected to counter 62 for visually indicating the contents of the counter. As will be appreciated by those skilled in the art, the clock 56 may be adapted to produce pulses at a repetition rate which is conveniently related to normal time measurements such that the contents of counter 62 may be directly interpreted in terms of tenths and/or hundreds of seconds as well as seconds, or a scaler of frequency divider may be inserted in series in line 60 before the counts are actually counted in counter 62.

The start flip-flop 46 may be switched to its "1" output state by a set signal on line 50 in response to either the first pulse or line 68 from multivibrator 12 or from an input pulse on line 70 which is somewhat delayed but caused by a manual start signal applied at terminal 72. The operation of start sequencer 74 will be discussed in more detail at a later point. However, at this time the operation of start sequencer 74 may be thought of as a mere delay means for delaying the start signal from terminal 72 before its appearance on line 70.

In operation, just before making a desired measurement, the reset signal may be applied in any known manner to the reset terminals of the system such as 54, 64, 40, and 76. This will result in the integrator 34 being reset to a starting point with respect to the output signal on 36; in counter 62 being reset to an initial value which may corresponds to "0"; in level detector 38 being reset to provide a "0" signal on line 42 and in start flip-flop 46 being set to provide "0" signal on line 48. Thus, since start flip-flop 46 has an "0" output on line 48, there is no enable signal and therefore clock 56 will not be providing any pulses on line 60 to counter 62 and the contents of counter 62 will therefore remain at its initial or "0" contents:

First, assuming a manual start, a manual start signal is applied at terminal 72 and after a delay through start sequencer 74, a signal on line 70 will appear which will be passed through OR gate 52 to reset flip-flop 46 and provide a "1" output therefrom on line 48 for input to clock 56 enable terminal. Thus, an enable signal on line 48 will be produced and clock 56 will begin producing clock pulses on line 60 for accumulation in counter 62 and display on indicator 66.

Assuming that a driver begins to accelerate from a standing start concurrent with the setting of flip-flop 46 and hence at the beginning of counting in counter 62, the signals from signal pickup 10 and hence from multivibrator 16 will begin and will be integrated by integrator 34. When the integrated output of these signals at 36 reaches the predetermined level corresponding to a predetermined traveled distance such as one-quarter mile, level detector 38 will be set and thus switched to its "1" output state on line 42 to set overide start flip-flop. This causes its output to be a "0" on line 48 which, of course, stops clock 56 from producing any further clock pulses. Accordingly, the contents of counter 62 are now indicative of the elapsed time between the start signal (corresponding to the set signal on line 50 for flip-flop 46) and the stop signal on line 42 from level detector 38. Thus, the contents of counter 62 as visually indicated on indicator 66 represent the elapsed time required for the vehicle to travel from a standing start over a predetermined distance such as one-fourth of a mile.

The operation of start sequencer 74 may now be readily appreciated. It would be advantageous for the vehicle driver to have some indication as to when he should begin the acceleration of the vehicle synchronously with the setting of flip-flop 46 in order to provide an accurate indication of the elapsed time necessary to actually travel the predetermined distance.

Start sequencer 74 is for the purpose of helping synchronize the driver's initiation of vehicle movement with the appearance of a start signal on line 70 for setting flipnflop 46. As shown in FIG. 1, start sequencer 74 is shown as having three visual indicators 78, 80, and 82. These visual indicators are for the purpose of providing a sort of "count down" thus giving the operator a visual indication of the time when he should begin the vehicle's acceleration.

For instance, when the vehicle driver applies a start signal to line 72, start sequencer 74 will light bulb 78 corresponding to a red color. A certain time after bulb 78 has been lit, indicator 80 corresponding to an amber color is turned on. And after another subsequent time interval, a green indicator 82 is turned on and the delayed start signal from terminal 72 is concurrently passed on line 70 to set flip-flop 46 and begin the time measuring cycle.

Thus, after pushing button 72, the operator may watch indicators 78, 80, and 82 as they sequentially turn on at regular time intervals and ready himself to begin the acceleration concurrently with the lighting of the last element such as green light 82 in FIG. 1. As will be obvious to those skilled in the art, there are many means which may be used within start sequencer 74 for producing the required delays and sequential energization of the various visual indicator means. Additionally, fewer or more visual indicator means could be utilized as will be appreciated.

Automatic starting of the time measurement cycle may now be readily appreciated. If the operator of the vehicle after pushing the start button 72 begins his acceleration before green light 82 is lit, the first pulse appearing on line 14 will be admitted through OR gate 52 to set flip-flop 46 and begin the elapsed time measurement automatically without waiting for a start signal on line 70.

Although only one embodiment of this invention has been specifically discussed in the above specification, those skilled in the art will readily appreciate that many modifications of the disclosed embodiment are possible without altering the desired results. For instance, clock 56 may be a continuous running clock with the clock signals gated to counter 62 rather than having clock 56 controlled as indicated in the exemplary embodiment. Numerous other modifications of the disclosed apparatus will be readily apparent to those skilled in the art and are therefore intended to be included within the scope of this invention.

What is claimed is:

1. Apparatus for measuring the time required from pulses proportional in number to the distance travelled by a wheeled vehicle to change from a first value to a second value, said apparatus comprising:
   pulse generating means for producing pulses proportional in number to the value of a measured parameter comprising distance travelled by a wheeled vehicle,
   integrating means for producing an output signal proportional to an accumulation of said pulses occurring after the occurrence of said first value of said measured parameter,
   clock means for producing clock pulses at a predetermined rate,
   counter means operatively connected to said means for counting said clock pulses,
   starting means for causing said counter means to start counting from a preselected content when said measured parameter has said first value, and
   level detecting means operatively connected to said integrating means for detecting when said output of said integrating means corresponds to said second value and for producing a stop signal in response thereto for stopping said counter means, thereby causing the contents of said counter means to be indicative of said elapsed time required for the measured parameter to change from said value to said second value,
   wherein said starting means includes:
      a bi-stable start flip-flop for producing a clock starting signal when in a first state,
      manual means for causing said start flip-flop to switch to said first state when said measured parameter is at said first value, and
      automatic means actuated in response to at least one pulse output from said pulse generating means for causing said start flip-flop to switch to said first state when said measured parameter is substantially at said first value if not already switched by said manual means.

2. Apparatus as in claim 1 wherein said manual means includes sequencer means having:
   a manually operated switch, and
   count down indicating means for indicating sequential time periods after operation of said manually operated switch leading up to eventual switching of said start flip-flop.

3. Apparatus as in claim 1 including an OR gate operatively connected to said start flip-flop wherein said automatic means comprises a connection between said pulse generating means and an input of said OR gate and wherein another input of said OR gate is connected to said manual means.

4. Apparatus as in claim 1 wherein said level detecting means comprises a bi-stable detector flip-flop for switching from a first state to a second state when the output from said integrating means reaches a predetermined level corresponding to said second measured parameter value and wherein the output of said bi-stable detector produces said stop signal for effectively stopping the count of clock pulses.

5. Apparatus as in claim 4 wherein said clock means is normally disabled unless provided with an "enable" signal and further including start/stop AND gate means for producing said "enable" signal only when both said start flip-flop is in said first state and said detector flip-flop is in said first state.

6. Apparatus as in claim 1 including indicator means connected to said counter means for visually displaying the contents of said counter.

* * * * *